US012719865B2

(12) United States Patent
Redmond et al.

(10) Patent No.: US 12,719,865 B2
(45) Date of Patent: Aug. 25, 2026

(54) SOUND-BASED USER AUTHENTICATION FOR EDGE DEVICES

(71) Applicant: Schneider Electric Systems USA, Inc., Foxborough, MA (US)

(72) Inventors: James Redmond, Richmond (CA); Zackery Sobin, Tryon, NC (US)

(73) Assignee: SCHNEIDER ELECTRIC SYSTEMS USA, INC., Foxborough, MA (US)

(*) Notice: Subject to any disclaimer, the term of this patent is extended or adjusted under 35 U.S.C. 154(b) by 123 days.

(21) Appl. No.: 18/667,643

(22) Filed: May 17, 2024

(65) Prior Publication Data

US 2025/0358283 A1 Nov. 20, 2025

(51) Int. Cl.
*H04L 9/40* (2022.01)

(52) U.S. Cl.
CPC ................................ *H04L 63/0876* (2013.01)

(58) Field of Classification Search
CPC ... H04L 9/3247; H04L 9/3271; H04L 63/102; H04L 63/20; H04L 67/06; H04L 67/1097; G06F 8/61; G06F 9/54; G06F 9/4401; G06F 16/137; G06F 16/164; G06F 16/168; G06F 16/122; G06F 16/11
See application file for complete search history.

(56) References Cited

U.S. PATENT DOCUMENTS 7,314,169 B1 1/2008 Jasper et al.
9,706,406 B1 * 7/2017 Adams .................... G06F 21/32
11,687,493 B1 * 6/2023 Maturana ............... G06Q 50/04 709/201
2016/0112204 A1 * 4/2016 Cipli ..................... H04L 9/3247 713/176
2016/0371475 A1 12/2016 Zhao et al.
2018/0173860 A1 * 6/2018 Mori ....................... G06F 21/30
2018/0232511 A1 * 8/2018 Bakish .................... G06F 21/32
2019/0260742 A1 * 8/2019 Arora ..................... G06N 3/045
2021/0194927 A1 * 6/2021 Adel ................... H04L 63/0245

OTHER PUBLICATIONS

Anonymous, Scada—Wikipedia, Apr. 26, 2024, URL:https://en.wikipedia.org/w/index.php?title=SCADA&oldid=1220863331 [retrieved on Jul. 23, 2025]12 pages.
Extended European Search Report from EP Application No. 25176129.2, mailed Aug. 6, 2025. 9 pages.

* cited by examiner

*Primary Examiner* — Khoi V Le
(74) *Attorney, Agent, or Firm* — Stinson LLP

(57) ABSTRACT

An authentication system for an industrial plant is configured for authenticating a user device to either permit or deny the user device access to an industrial edge device. The authentication system broadly comprises the industrial edge device, the user device, and the authentication processor. The industrial edge device is configured for at least one of monitoring and controlling an operation within the industrial plant. The user device is configured to communicate with the industrial edge device to request access to the industrial edge device. The authentication processor is associated with the industrial edge device, and the authentication processor is configured to communicate an audio authentication task to the user device in response to the request for access. The authentication processor is further configured to verify a response to the audio authentication task from the user device for determining whether to grant the user device access to the industrial edge device.

17 Claims, 5 Drawing Sheets

100
INDUSTRIAL PLANT 102
INDUSTRIAL EDGE DEVICES 106
MEMORY 110
AUTHENTICATION PROCESSOR 108
PLC
TRANSMITTER
SENSOR
RTU
MODEM
INSTRUMENT
DATA RADIO
116
112
114
104
AUTHENTICATION PROCESSOR 108
118
SCADA SYSTEM 120
AUTHENTICATION PROCESSOR 108
122

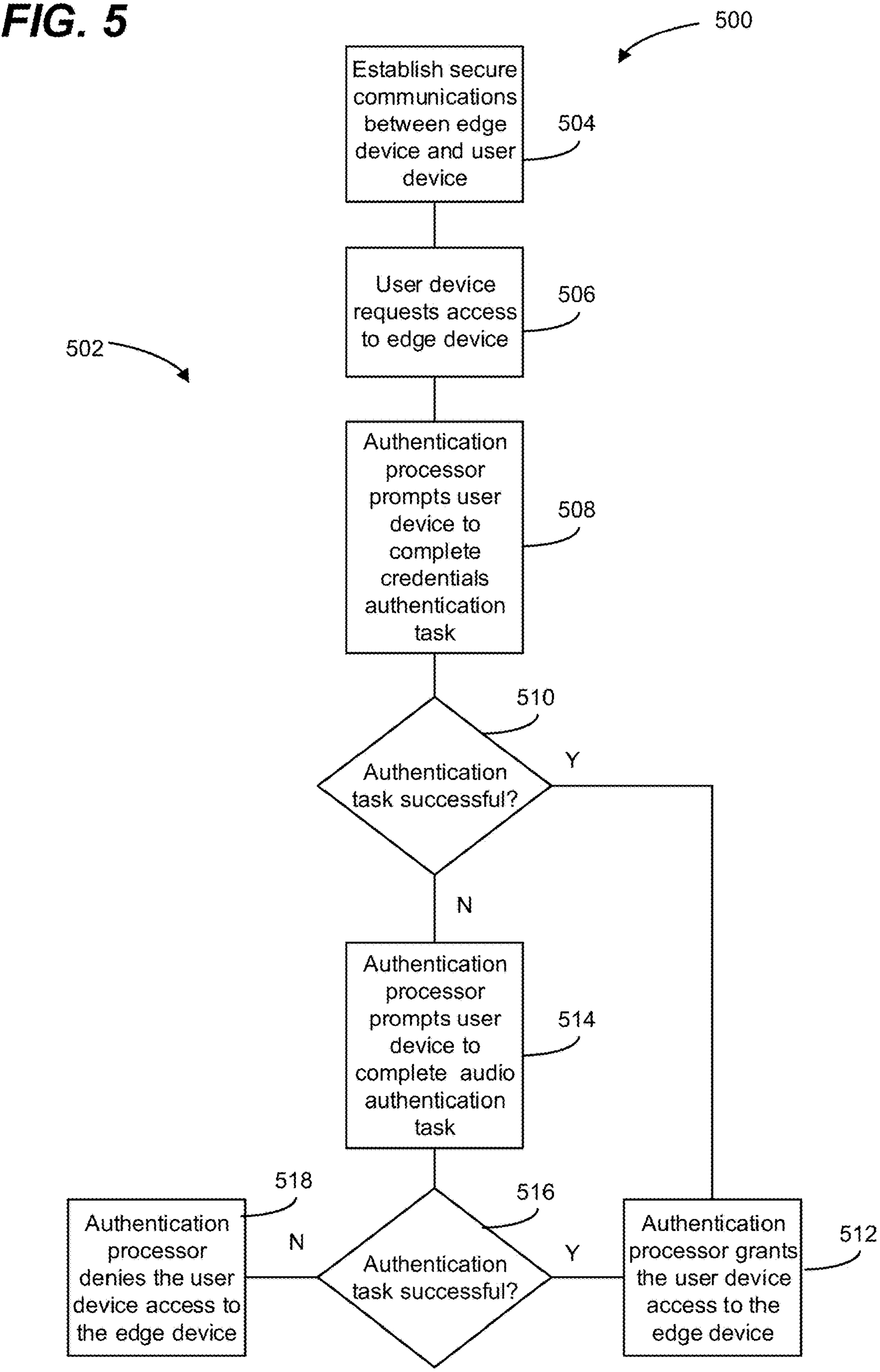
FIG. 5
500
Establish secure communications between edge device and user device
504
User device requests access to edge device
506
502
Authentication processor prompts user device to complete credentials authentication task
508
510
Authentication task successful?
Y
N
Authentication processor prompts user device to complete audio authentication task
514
518
516
Authentication processor denies the user device access to the edge device
N
Authentication task successful?
Y
Authentication processor grants the user device access to the edge device
512

SOUND-BASED USER AUTHENTICATION FOR EDGE DEVICES

FIELD

The present disclosure generally relates to multi-factor authentication of industrial edge devices and more particularly to sound-based user authentication.

BACKGROUND

Industrial plants are increasingly using the Internet of Things (IoT) to optimize production processes. The IoT within industrial plants generally includes interconnected smart devices such as processors and sensors configured to collect, transmit, process, and respond to data obtained from the industrial plants. One example of smart devices used in industrial plants includes industrial edge devices. Industrial edge devices are generally preferred smart devices, as they are compatibly configured for ease of connection with other devices in an industrial plant. With their increased importance in industrial plants, smart devices have become significant targets for malicious hackers.

SUMMARY

Aspects of the present disclosure permit an improved framework for audiologically authenticating industrial edge devices.

In one aspect, an authentication system for an industrial plant comprises an industrial edge device configured for at least one of monitoring and controlling an operation within the industrial plant. A user device is configured to communicate with the industrial edge device to request access to the industrial edge device. An authentication processor is associated with the industrial edge device. The authentication processor is configured to communicate an audio authentication task to the user device in response to the request for access. The authentication processor is further configured to verify a response to the audio authentication task from the user device for determining whether to grant the user device access to the industrial edge device.

In another aspect, a method for enabling secure access to an industrial edge device of an industrial plant comprises establishing communication between the industrial edge device and a user device. The user device transmits a request to the industrial edge device, to access the industrial edge device.

The industrial edge device receives the request. In response to the request, an authentication processor associated with the industrial edge device transmits an audio authentication task to the user device for the user device to execute to provide as a response thereto. The authentication processor verifies the response provided by the user device to determine whether to grant the user device access to the industrial edge device.

Other objects and features will be in part apparent and in part pointed out hereinafter.

BRIEF DESCRIPTION OF THE DRAWINGS

FIG. 5 is a flow chart of an exemplary method for enabling secure access to an industrial edge device of an industrial plant, according to an embodiment.

Corresponding reference characters indicate corresponding parts throughout the drawings.

DETAILED DESCRIPTION

The present disclosure generally relates to an authentication system for an industrial plant. The authentication system of the present disclosure provides a multi-factor authentication of user devices to either permit or deny the user devices access to industrial edge devices within an industrial plant. Accordingly, at least one of the factors includes an audio authentication task for authenticating the user device. As will be explained in greater detail below, authentication systems and methods in accordance with the present disclosure provide an improved solution for preventing unauthorized user devices from interfering with critical devices such as industrial edge devices in an industrial plant.

Figure 1:
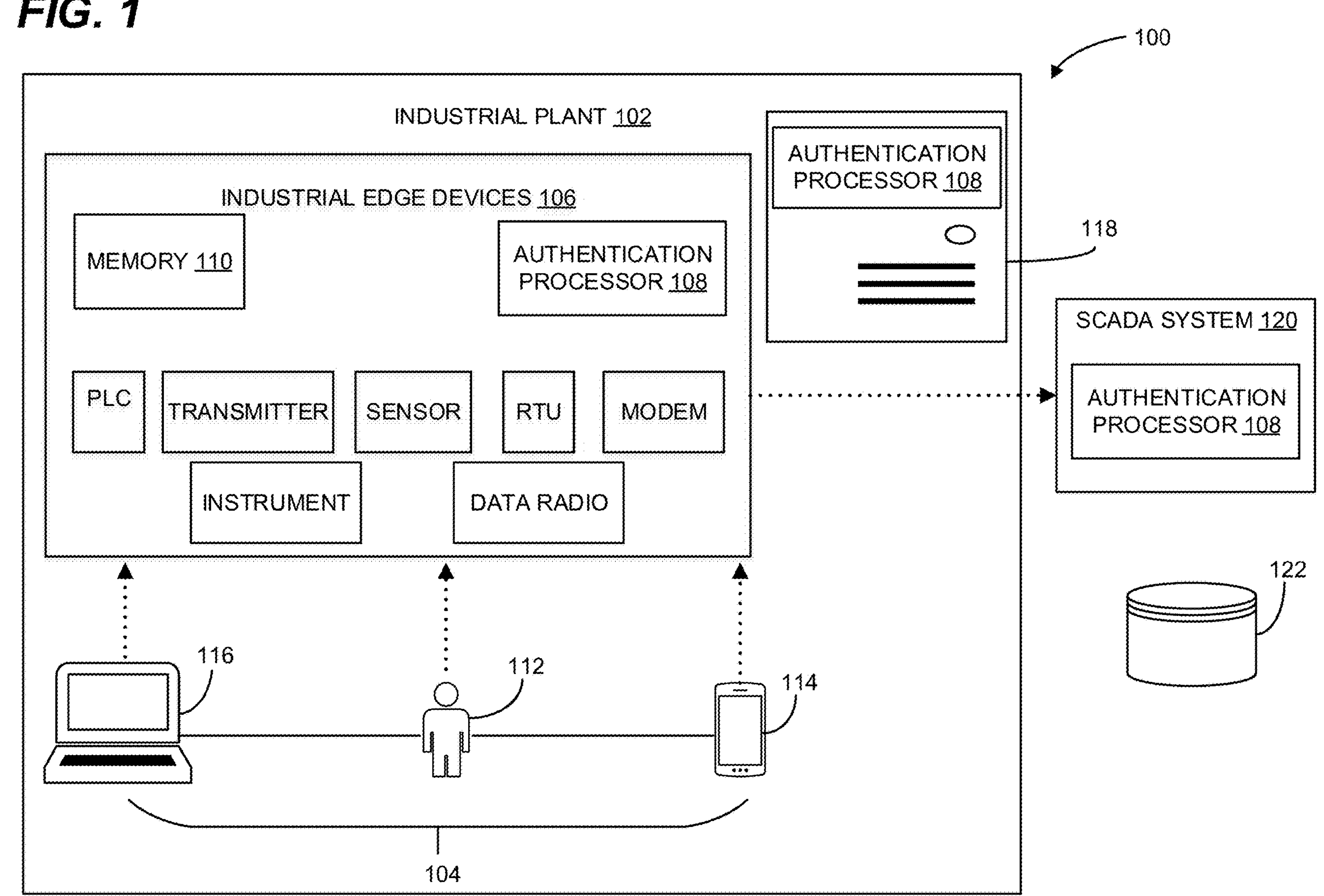
FIG. 1 is a schematic illustration of an authentication system for an industrial plant, according to an embodiment.
Figure 2:
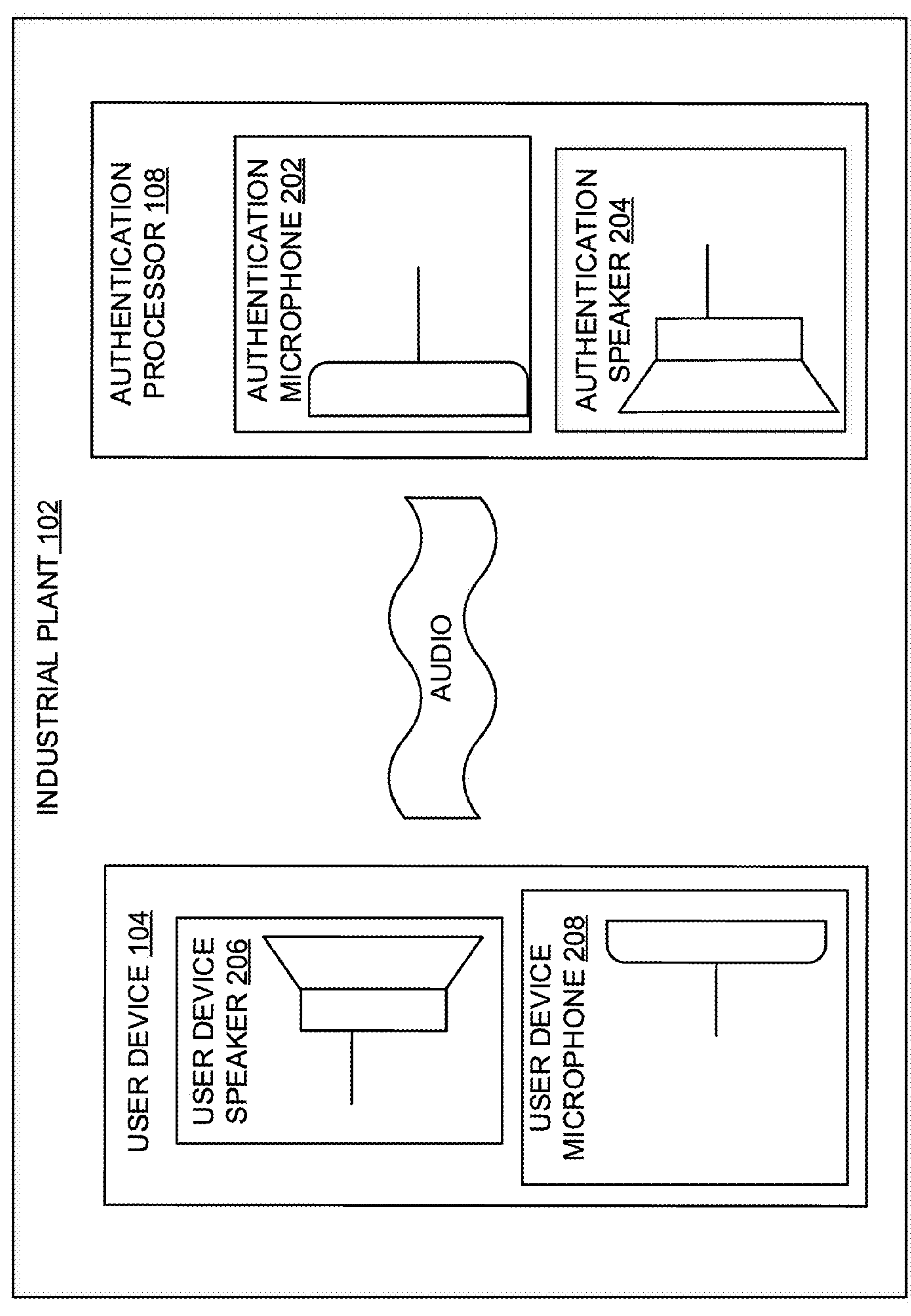
FIG. 2 is a schematic illustration of a user device and authentication processor of the authentication system shown in FIG. 1, according to an embodiment.

Referring now to FIG. 1, an authentication system in accordance with the present disclosure is generally indicated at reference number 100. The authentication system 100 authenticates devices within an industrial plant 102. Broadly the authentication system 100 comprises a user device 104, an industrial edge device 106, and an authentication processor 108. The user device 104 communicates with the industrial edge device 106 to request access to the industrial edge device (e.g., to view, transmit, control, etc., data and operating parameters of the industrial edge device). The authentication processor 108 is associated with the industrial edge device 106, and communicates one or more authentication tasks such as an audio authentication task to the user device 104 in response to the request for access. The authentication processor 108 is then configured to verify one or more responses to the one or more authentication tasks from the user device 104 for determining whether to grant or deny the user device access to the industrial edge device 106. Individual components of the authentication system 100 will now be described before turning to an exemplary method for authenticating a user device 104 to enable secure access to an industrial edge device 106 of the industrial plant 102.

The industrial edge device 106 is configured for at least one of monitoring and controlling an operation within the industrial plant 102. For example, the industrial edge device 106 comprises one of a programmable logic controller (PLC), transmitter, sensor, remote terminal unit (RTU), instrument, data radio, and modem. In an exemplary embodiment, the industrial edge device 106 comprises a memory 110 configured for storing at least one of data regarding operations in the industrial plant 102, operating parameters for the industrial edge device, predetermined model response data used for authenticating the user device 104, and processor-executable instructions for executing an authentication method. In another embodiment, the industrial edge device 106 further comprises the authentication processor 108, and at least one of an authentication microphone 202 configured for receiving the response to the audio authentication task and an authentication speaker 204 configured for transmitting the audio authentication task. Furthermore, the industrial edge device 106 may include user inputs, a display, circuit boards and/or other electronic components for communicating with other devices of the authentication system 100, and other related elements.

Broadly, the user device 104 comprises a device utilized by a user 112 such as an employee of the industrial plant 102. User device examples embodying user devices 104 used to indirectly access the industrial edge device 106 will now be described. In one example, the user device 104 comprises a personal device 114, such as a smartphone associated with the user 112. In another example, the user device 104 comprises a shared device 116 that multiple users have access to, such as a kiosk or workstation. It is also contemplated that the user 112 may perform the authentication tasks directly at the industrial edge device 106, to directly access the industrial edge device, in which case the industrial edge device comprises user device 104. Generally, the user device 104 is configured to communicate with the industrial edge device 106 to request access to the industrial edge device. For example, the user device 104 is configured to communicate with the industrial edge device 106 using a communication protocol such as a Transmission Control Protocol/Internet Protocol (TCP/IP) such as a Secure Shell (SSH) protocol. In another example, the user device 104 is configured to communicate with the industrial edge device 106 using a communication protocol such as a User Datagram Protocol (UDP). However, it will be apparent to one of ordinary skill in the art that other communication protocols may be used without departing from the scope of the present disclosure. Furthermore, the user device 104 comprises a user device speaker 206 configured for providing the response to the authentication processor 108, and a user device microphone 208 configured for executing the audio authentication task. In an exemplary embodiment, the user device 104 comprises a memory, user inputs, a display, circuit boards and/or other electronic components for communicating with other devices of the authentication system 100, and other related elements.

It is envisioned that in different embodiments, the authentication processor 108 may be integrated on different devices associated with the industrial plant 102. For example, the authentication processor 108 may be integrated on one of a separate device on a central server 118 of the industrial plant 102, the industrial edge device 106, a Supervisory Control and Data Acquisition (SCADA) system 210 of the industrial plant, and on the shared device 116 of the industrial plant. In any of those instances, the devices may include a memory, user inputs, a display, a speaker, a microphone, circuit boards and/or other electronic components for communicating with other devices of the authentication system 100, and other related elements. Moreover, the authentication processor 108 is configured to execute processor executable instructions to authenticate the user device 104, as will be explained in greater detail below. The processor executable instructions may be stored in a memory of the device with the authentication processor thereon, or stored in an external database 122.

The authentication processor 108 is configured to execute the processor executable instructions to authenticate the user device 104. Broadly, the authentication processor 108 is associated with the industrial edge device 106 and configured to communicate one or more authentication tasks such as audio authentication tasks and additional authentication tasks to the user device 104 in response to the request for access from the user device to the industrial edge device. In one embodiment, the authentication processor 108 executes the processor-executable instructions to generate the authentication tasks. In another embodiment, the authentication processor 108 obtains the authentication tasks from other devices associated with the industrial plant (e.g., from the SCADA system 120).

The authentication processor 108 is configured to verify one or more responses to the one or more authentication tasks from the user device 104 for determining whether to grant or deny the user device access to the industrial edge device 106. It is also contemplated that in verification, the authentication processor 108 is configured to accept a certain range of responses to grant the user device 104 access to the industrial edge device 106 to accommodate for slight variation. In one example, verifying the response provided by the user device 104 to determine whether to grant the user device access to the industrial edge device 106 comprises comparing the response to a predetermined model response to detect a match (or a relatively close match that falls within the certain range of responses), such that if a match is detected the authentication processor 108 grants the user device access to the industrial edge device and if a match is not recognized the authentication processor denies the user device access to the industrial edge device.

In one embodiment, the authentication processor 108 is configured to execute a learning mode wherein the authentication processor learns the predetermined model responses and ranges associated therewith. For example, the authentication processor 108 is configured to execute learning mode to capture an ambient sound of a specified location within the industrial plant 102 via the authentication microphone 202. The captured ambient sound of the specified location is the predetermined model response to a passive sound recognition task, as will be explained in greater detail below. In another example, the authentication processor 108 is configured to execute learning mode to capture sounds such as user voices and equipment sounds via the authentication microphone 202 that will be used as the predetermined model responses. However, it will be apparent to a person of ordinary skill in the art that in the learning mode, the authentication processor 108 may be configured to capture other sounds to use as the predetermined model responses without departing from the scope of the present disclosure. In the learning mode, the authentication processor 108 is further configured to determine an acceptable range of ambient sound responses for accommodating for slight variation. The predetermined model responses and ranges associated therewith may be stored in a memory of the device with the authentication processor 108 thereon, or stored in the external database 122.

Figure 3:
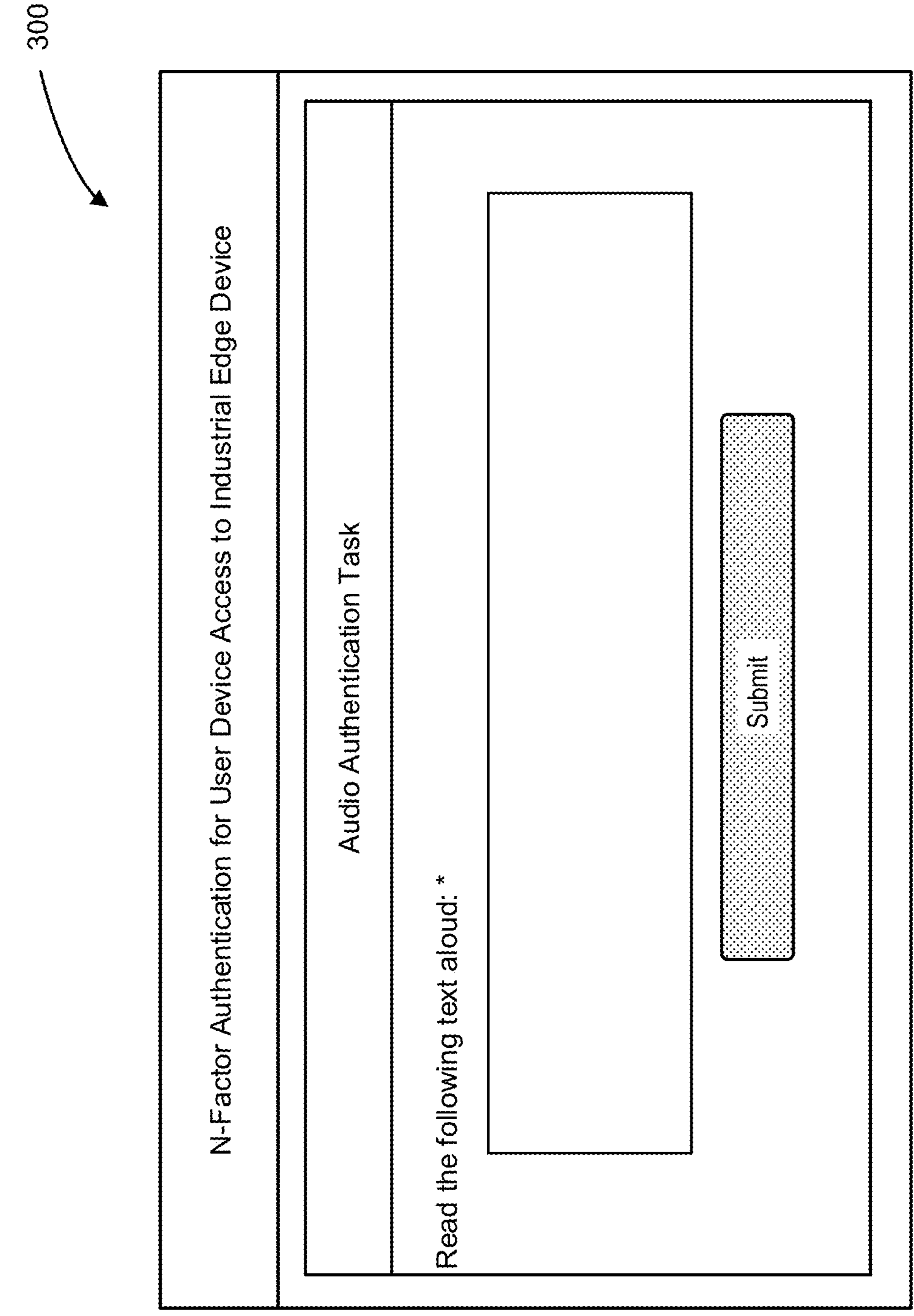
FIG. 3 is a schematic illustration of an audio authentication task, according to an embodiment.

The authentication tasks comprise audio authentication tasks and additional authentication tasks. The audio authentication tasks comprise audio-based tasks used to authenticate the user device 104. In an exemplary embodiment, audio authentication tasks comprise at least one of an active sound recognition task 300 wherein the user device 104 is prompted to provide as the response a predetermined sound, and the passive sound recognition task wherein the user device is prompted to provide as the response an ambient sound. FIG. 3 illustrates an exemplary active sound recognition task 300 provided to the user device 104, wherein the user 112 must read a text aloud to authenticate the user device. In the passive sound recognition task, the user device 104 is prompted to provide ambient sound indicative of particular surroundings as the response. For example, the user device 104 may try to gain access to an industrial edge device 106 within a particular area of the industrial plant 102. Accordingly, the authentication processor 108 knows the typical sound for that particular area, and will require the user device 104 to provide the particular sound or a sound close thereto within a predetermined acceptable range to authenticate the user device 104. The passive sound recognition task is particularly useful in instances where industrial edge devices are located in secured areas, that only certain users have access to (e.g., badge-access required areas). Therefore, if a user is able to access the secured area, and can provide the ambient sound of the secured area as the response to the passive sound recognition task, then access is granted.

Figure 4:
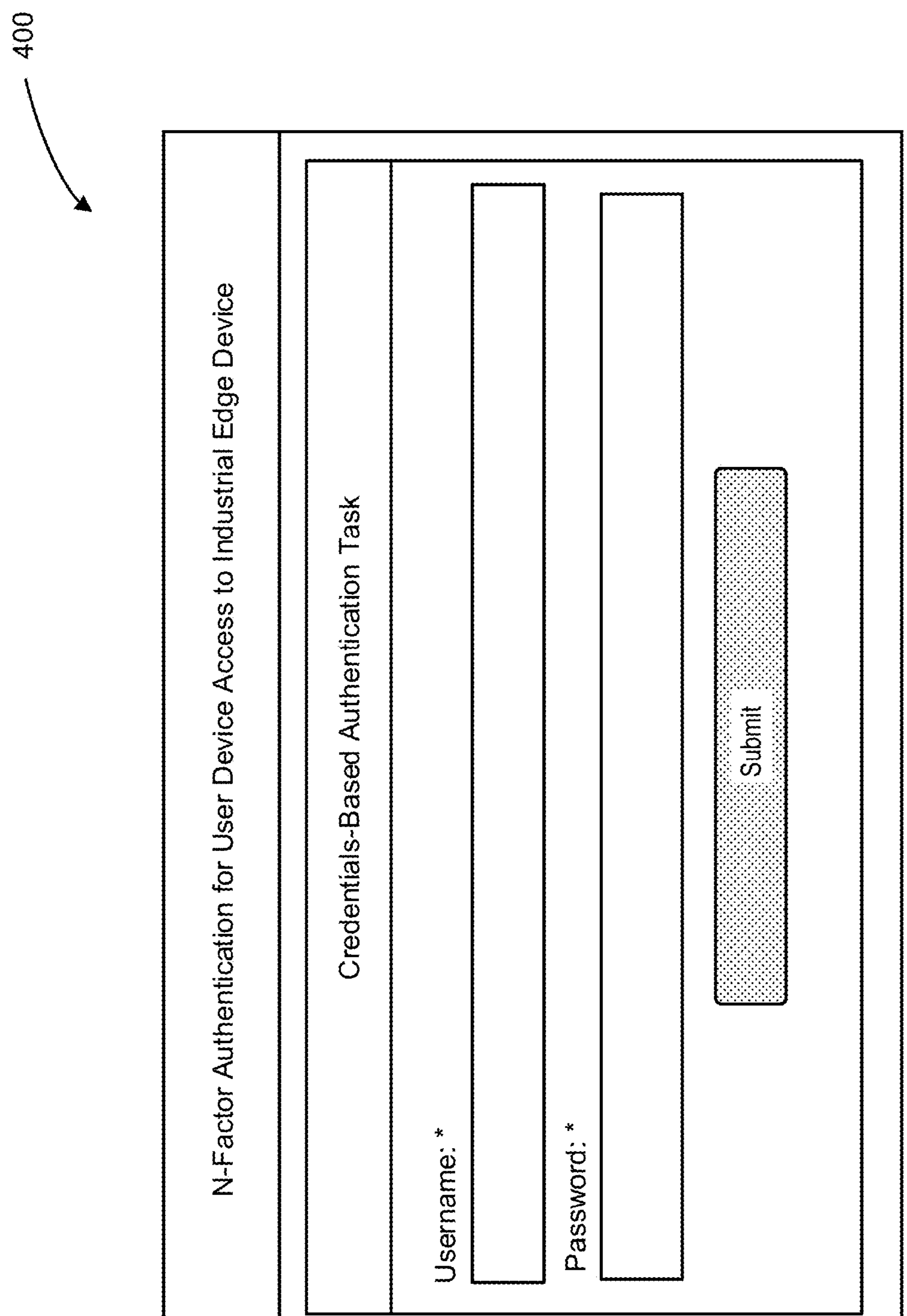
FIG. 4 is a schematic illustration of a credentials-based authentication task, according to an embodiment.

The additional authentication tasks comprise other types of authentication tasks such as credentials-based authentication tasks and graphic-based authentication tasks. FIG. 4 illustrates a credentials-based task 400 provided to the user device 104, wherein the user 112 must enter credentials specified by the credentials-based task to authenticate the user device.

A method for enabling secure access to the industrial edge device 106 of the industrial plant 102 will now be described. FIG. 5, illustrates a multi-factor embodiment 500 of the method, wherein there are two authentication tasks presented to the user device 104, however it will be apparent to a person of ordinary skill in the art that the method may comprise N-authentication tasks. A portion of the method generally referred to as the authentication method 502 comprises steps executable by the authentication processor 108. In one embodiment, the authentication processor 108 executes processor executable instructions to execute the authentication method 502.

Initially to request access to the industrial edge device 106 (e.g., to view, transmit, control, etc., data and operating parameters of the industrial edge device), a user 112 such as a plant employee, utilizes the user device 104 to establish communication with the industrial edge device (step 504). From here, the user 112 transmits a request to the industrial edge device 106 from the user device 104 to access the industrial edge device (step 506). For example, the user 112 sends the request from a workstation 116 in the industrial plant 102, or from their smartphone 114. Once the industrial edge device 106 receives the request, the authentication processor 108 associated with the industrial edge device 106, obtains an authentication task (such as the audio authentication task or additional authentication task) and transmits an authentication task to the user device 104 to execute to provide as a response thereto (step 508). In one embodiment, the authentication processor 108 executes processor executable instructions to generate the authentication task. In another embodiment, the authentication processor 108 obtains the authentication task from another device associated with the industrial plant 102 such as the SCADA system 120.

Next at step 510, the authentication processor 108 verifies the response provided by the user device 104. For example, the authentication processor 108 compares the response to a predetermined model response to detect a match (or a relatively close match that falls within a certain range of responses). If a match or relatively close match is detected, the authentication task performed at step 508 is deemed successful and the authentication processor 108 either grants the user device 104 access to the industrial edge device 106 (step 512), or sends another authentication task. If no match or relatively close match is detected, the authentication task performed at step 508 is deemed unsuccessful and the authentication processor 108 either denies the user device 104 access to the industrial edge device 106 or sends another authentication task (step 514). In another example, if the authentication processor 108 provides a passive sound recognition task to the user device 104, verifying the response provided by the user device includes comparing the ambient sound to a typical ambient sound for a specified location of the industrial plant 102 to detect a match, such that if a match is detected the authentication processor grants the user device access to the industrial edge device 106 and if a match is not recognized the authentication processor denies the user device access to the industrial edge device.

At step 516, the authentication processor 108 verifies the response provided by the user device 104 to the authentication task of step 514. If the authentication task performed at step 514 is deemed successful, the authentication processor 108 grants the user device 104 access to the industrial edge device 106. If the authentication task performed at step 514 is deemed unsuccessful, the authentication processor 108 denies the user device 104 access to the industrial edge device 106 (step 518). In other embodiments, additional authentication tasks may be provided before authenticating the user device 104. Moreover, in an optional step, at least one of the authentication processor 108 and industrial edge device 106 are configured to transmit an alert to other devices associated with the industrial plant 102 such as the SCADA system 120 in response to the authentication processor denying the user device 104 access to the industrial edge device.

Embodiments of the present disclosure comprise a special purpose computer including a variety of computer hardware, as described in greater detail herein and are operational with other special purpose computing system environments or configurations even if described in connection with an example computing system environment. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices. For purposes of illustration, programs and other executable program components may be shown as discrete blocks. It is recognized, however, that such programs and components reside at various times in different storage components of a computing device, and are executed by a data processor(s) of the device.

In operation, processors, computers, and/or servers may execute the processor-executable instructions (e.g., software, firmware, and/or hardware) such as those illustrated herein to implement aspects of the invention. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the present disclosure.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

Having described the invention in detail, it will be apparent that modifications and variations are possible without departing from the scope of the invention defined in the appended claims.

When introducing elements of the present invention or the preferred embodiments(s) thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. An authentication system for an industrial plant, the authentication system comprising:

an industrial edge device configured for at least one of monitoring and controlling an operation within the industrial plant;

a user device configured to communicate with the industrial edge device to request access to the industrial edge device;

an authentication speaker configured to communicate an audio authentication task to the user device;

an authentication microphone configured to receive a response to the audio authentication task from the user device;

an authentication processor associated with the industrial edge device, the authentication processor configured to:

provide the audio authentication task in response to the request for access, verify the response to the audio authentication task from the user device for determining whether to grant the user device access to the industrial edge device, wherein verifying the response comprises comparing the response to a predetermined model response to detect a match, such that if a match is detected, the authentication processor grants the user device access to the industrial edge device, and if a match is not recognized, the authentication processor denies the user device access to the industrial edge device;

wherein the user device comprises a user device microphone and a user device speaker, the user device microphone configured for executing the audio authentication task and the user device speaker configured for providing the response to the authentication processor; and wherein the audio authentication task comprises at least a passive sound recognition task, wherein the user device is prompted to provide as the response an ambient sound.

2. The authentication system of claim 1, wherein the industrial edge device comprises one of a remote terminal unit (RTU), programmable logic controller (PLC), programmable automation controller (PAC), sensor, instrument, data radio, and modem.

3. The authentication system of claim 1, wherein the user device comprises a personal device or a shared device.

4. The authentication system of claim 1, wherein the user device communicates with the industrial edge device using a Transmission Control Protocol/Internet (TCP/IP) protocol.

5. The authentication system of claim 1, wherein the user device communicates with the industrial edge device using a User Datagram Protocol (UDP).

6. The authentication system of claim 1, wherein the audio authentication task further comprises an active sound recognition task, wherein the user device is prompted to provide as the response a predetermined sound.

7. The authentication system of claim 1, wherein the authentication processor is further configured to communicate one or more additional authentication tasks to the user device in response to the request for access and to verify an additional response to the one or more additional authentication tasks for determining whether to grant the user device access to the industrial edge device.

8. The authentication system of claim 7, wherein at least one of the one or more additional authentication tasks comprises a credentials-based authentication task.

9. The authentication system of claim 1, wherein the authentication processor is configured to execute processor-executable instructions to generate the audio authentication task.

10. The authentication system of claim 1, wherein the authentication processor is configured to communicate with a Supervisory Control and Data Acquisition (SCADA) system of the industrial plant to obtain the audio authentication task.

11. A method for enabling secure access to an industrial edge device of an industrial plant, the method comprising:
- establishing communication between the industrial edge device and a user device;
- transmitting, by the user device, a request to the industrial edge device, to access the industrial edge device;
- receiving, at the industrial edge device, the request;
- in response to the request, transmitting, by an authentication processor associated with the industrial edge device, an audio authentication task to the user device for the user device to execute to provide as a response thereto;
- verifying, by the authentication processor, the response provided by the user device to determine whether to grant the user device access to the industrial edge device, wherein verifying the response comprises comparing the response to a predetermined model response to detect a match, such that if a match is detected, the authentication processor grants the user device access to the industrial edge device, and if a match is not recognized, the authentication processor denies the user device access to the industrial edge device; and
  - wherein the audio authentication task comprises at least a passive sound recognition task, and wherein the user device is prompted to provide as the response an ambient sound.

12. The method of claim 11, further comprising transmitting, at the authentication processor, an alert to a Supervisory Control and Data Acquisition (SCADA) system of the industrial plant in response to the authentication processor denying the user device access to the industrial edge device.

13. The method of claim 11, wherein the audio authentication task further comprises an active sound recognition task wherein the user device is prompted by the authentication processor to provide as the response a predetermined sound.

14. The method of claim 1, wherein for the passive sound recognition task, said verifying, by the authentication processor, the response provided by the user device to determine whether to grant the user device access to the industrial edge device comprises comparing the ambient sound to a typical ambient sound for a specified location of the industrial plant to detect a match, such that if a match is detected the authentication processor grants the user device access to the industrial edge device and if a match is not recognized the authentication processor denies the user device access to the industrial edge device.

15. The method of claim 14, further comprising executing a learning mode, at the authentication processor, to learn the typical ambient sound for the specified location of the industrial plant.

16. The method of claim 11, further comprising transmitting, by the authentication processor, one or more additional authentication tasks to the user device for the user device to execute to provide as an additional response thereto and verifying, by the authentication processor, the additional response to determine whether to transmit at least one of another additional authentication task and another audio authentication task or to determine whether to grant the user device access to the industrial edge device.

17. The method of claim 16, further comprising at least one of executing, by the authentication processor, processor-executable instructions to generate at least one of the audio authentication task and one or more additional authentication tasks, and communicating, at the authentication processor with a Supervisory Control and Data Acquisition (SCADA) system of the industrial plant to obtain at least one of the audio authentication task and one or more additional authentication tasks.

* * * * *